United States Patent
Army et al.

(10) Patent No.: US 12,071,247 B2
(45) Date of Patent: Aug. 27, 2024

(54) TRIM MODULE WITH THERMOELECTRIC COOLER

(71) Applicant: Hamilton Sundstrand Corporation, Charlotte, NC (US)

(72) Inventors: Donald E. Army, Enfield, CT (US); Jeffrey Ernst, Wethersfield, CT (US); Earl J. LaVallee, Glastonbury, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 118 days.

(21) Appl. No.: 17/732,671

(22) Filed: Apr. 29, 2022

(65) Prior Publication Data
US 2023/0348068 A1 Nov. 2, 2023

(51) Int. Cl.
*B64D 13/06* (2006.01)
(52) U.S. Cl.
CPC ...... *B64D 13/06* (2013.01); *B64D 2013/0688* (2013.01)
(58) Field of Classification Search
CPC .................. B64D 13/06; B64D 2013/0688
See application file for complete search history.

(56) References Cited

U.S. PATENT DOCUMENTS

| 5,584,183 A | 12/1996 | Wright et al. |
| 6,530,231 B1 * | 3/2003 | Nagy ............... B60N 3/104 |
| | | 136/203 |
| 2010/0274396 A1 | 10/2010 | Yang et al. |
| 2013/0125563 A1 * | 5/2013 | Jun ................... B60H 1/00478 |
| | | 62/3.3 |
| 2015/0021006 A1 * | 1/2015 | Vue ....................... F24F 13/04 |
| | | 165/263 |
| 2018/0148181 A1 | 5/2018 | Army |

(Continued)

FOREIGN PATENT DOCUMENTS

| CN | 101378958 B | 7/2013 |
| DE | 3333078 A1 | 6/2018 |

(Continued)

OTHER PUBLICATIONS

European Search Report issued in European Application No. 23169283.1 dated Sep. 27, 2023.

*Primary Examiner* — Gordon A Jones
(74) *Attorney, Agent, or Firm* — CANTOR COLBURN LLP

(57) ABSTRACT

A trim module having a first heat exchanger; a second heat exchanger; and a thermoelectric cooler (TEC) module thermally coupled between the heat exchangers; a mix manifold conduit fluidly coupled to the inlet of the first heat exchanger; a zone supply conduit fluidly coupled to the outlet of the first heat exchanger; a cabin return conduit fluidly coupled to the inlet of the second heat exchanger; an exhaust conduit fluidly coupled to the outlet of the second heat exchanger, wherein the TEC module is configured to operate in a first mode or a second mode, depending on a temperature within the zone supply conduit and a target temperature, and in the first mode, the TEC module transfers thermal energy from the first heat exchanger to the second heat exchanger; and in the second mode the TEC module transfers thermal energy from the second heat exchanger to the first heat exchanger.

5 Claims, 2 Drawing Sheets

(56) References Cited

U.S. PATENT DOCUMENTS

| | | | |
|---|---|---|---|
| 2020/0018526 A1* | 1/2020 | Oh | F25B 47/02 |
| 2020/0377216 A1 | 12/2020 | Pearson et al. | |
| 2021/0318036 A1* | 10/2021 | Dass | F25B 21/04 |

FOREIGN PATENT DOCUMENTS

| | | | |
|---|---|---|---|
| EP | 0730720 B1 | 7/2000 | |
| EP | 3330181 A1 | 6/2018 | |
| EP | 3333078 B1 | 10/2020 | |

* cited by examiner

TRIM MODULE WITH THERMOELECTRIC COOLER

BACKGROUND

The embodiments related to an environmental control system (ECS) of an aircraft and more specifically to an ECS having a trim module configured with a thermoelectric cooler.

An air cycle machine (ACM) is the refrigeration unit of the environmental control system (ECS) used in pressurized aircraft. Normally an aircraft has two or more ACMs. Each ACM and its components are often referred to as an air conditioning pack, or AC pack. On most jetliners, the AC packs are located in the wing-to-body fairing (aerodynamic structure) between the two wings beneath the fuselage.

In the case of gas turbine aircraft, the air cycle cooling process is achieved primarily by expanding compressed engine air through an ACM cooling turbine with the cooled output air from the process being used directly for cabin ventilation or for cooling electronic equipment. Some or all of the AC pack exhaust air can be ducted into the pressurized fuselage and is typically mixed with filtered air from the ECS's recirculation fans, and fed into a mix manifold. On most modern jetliners, the airflow in the mix manifold is approximately half outside air and half filtered air. Air from the mix manifold is directed to overhead distribution nozzles in the various zones of the aircraft.

Temperature in each zone is typically adjusted by adding small amounts of high temperature trim air that is tapped off the AC pack air supply and regulated to be slightly higher than the cabin pressure. To transfer trim air to the zone ducting from the AC pack, a conventional aircraft utilizes a system of pressure regulating valves, pressure sensors, trim valves, check valves, mufflers, bulkhead shrouds, structural penetrations and structural reinforcement doublers. Such systems for transferring trim air to zone ducting, generically referred to herein as a trim system, also includes ducts, along with duct couplings, hangers and supports, and trim injectors. As used herein, trimming air means conditioning air, i.e., trimming up means to raise temperature of an airflow and trimming down means to lower temperature of an airflow.

BRIEF DESCRIPTION

Disclosed is a trim module of an aircraft environmental control system, the trim module including: a first heat exchanger having an inlet and an outlet; a second heat exchanger having an inlet and an outlet; and a thermoelectric cooler (TEC) module thermally coupled between the first and second heat exchangers; a mix manifold conduit fluidly coupled to the inlet of the first heat exchanger; a zone supply conduit fluidly coupled to the outlet of the first heat exchanger; a cabin return conduit fluidly coupled to the inlet of the second heat exchanger; an exhaust conduit fluidly coupled to the outlet of the second heat exchanger, wherein the TEC module is configured to operate in a first mode or a second mode, depending on a temperature within the zone supply conduit and a target temperature, and wherein: in the first mode, the TEC module is configured to transfer thermal energy from the first heat exchanger to the second heat exchanger; and in the second mode the TEC module is configured to transfer thermal energy from the second heat exchanger to the first heat exchanger.

In addition to one or more of the above disclosed aspects of the trim module, or as an alternate, the trim module includes a temperature sensor in the zone supply conduit, wherein the TEC module is configured to operate in the first mode or the second mode depending on the temperature sensed by the temperature sensor and the target temperature.

In addition to one or more of the above disclosed aspects of the trim module, or as an alternate, the trim module includes an exhaust fan fluidly coupled to the outlet of the second heat exchanger and the exhaust conduit.

In addition to one or more of the above disclosed aspects of the trim module, or as an alternate, the TEC module includes a plurality of thermoelectric coolers configured as a circuit.

Further disclosed is an environmental control system of an aircraft, including: a mix manifold having an outlet; and a trim module having one or more of the above disclosed aspects, wherein the outlet of the mix manifold is fluidly coupled to the mix manifold conduit of the trim module.

In addition to one or more of the above disclosed aspects of the system, or as an alternate, the system includes a temperature sensor in the zone supply conduit, wherein the TEC module is configured to operate in the first mode or the second mode depending on the temperature sensed by the temperature sensor and the target temperature.

In addition to one or more of the above disclosed aspects of the system, or as an alternate, the system includes an exhaust fan fluidly coupled to the outlet of the second heat exchanger and the exhaust conduit.

In addition to one or more of the above disclosed aspects of the system, or as an alternate, the TEC module includes a plurality of thermoelectric coolers configured as a circuit.

In addition to one or more of the above disclosed aspects of the system, or as an alternate, the system includes an exhaust manifold fluidly coupled to the exhaust conduit of the second heat exchanger.

In addition to one or more of the above disclosed aspects of the system, or as an alternate, the mix manifold includes an inlet; and the system includes a recirculating fan fluidly coupled to the inlet of the mix manifold.

In addition to one or more of the above disclosed aspects of the system, or as an alternate, the system includes an air conditioning pack fluidly coupled to the inlet of the mix manifold.

In addition to one or more of the above disclosed aspects of the system, or as an alternate, the mix manifold includes additional outlets; and
 the system includes additional trim modules fluidly coupled to respective ones of the additional outlets of the mix manifold, wherein each of the trim modules have a same configuration as each other.

Further disclosed is an aircraft including: a cabin including a zone, the zone including a zone duct; a bay; and a system having one or more of the above disclosed aspects disposed in the bay, wherein: a temperature sensor is deposed in the zone supply conduit; the zone supply conduit of the first heat exchanger is fluidly coupled to the zone duct of the zone; and an exhaust fan is fluidly coupled to the outlet of the second heat exchanger and the exhaust conduit.

In addition to one or more of the above disclosed aspects of the aircraft, or as an alternate, the TEC module includes a plurality of thermoelectric coolers configured as a circuit.

In addition to one or more of the above disclosed aspects of the aircraft, or as an alternate, the plurality of thermoelectric coolers are electrically coupled in series or parallel.

In addition to one or more of the above disclosed aspects of the aircraft, or as an alternate, the plurality of thermoelectric coolers are thermally coupled in series or parallel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
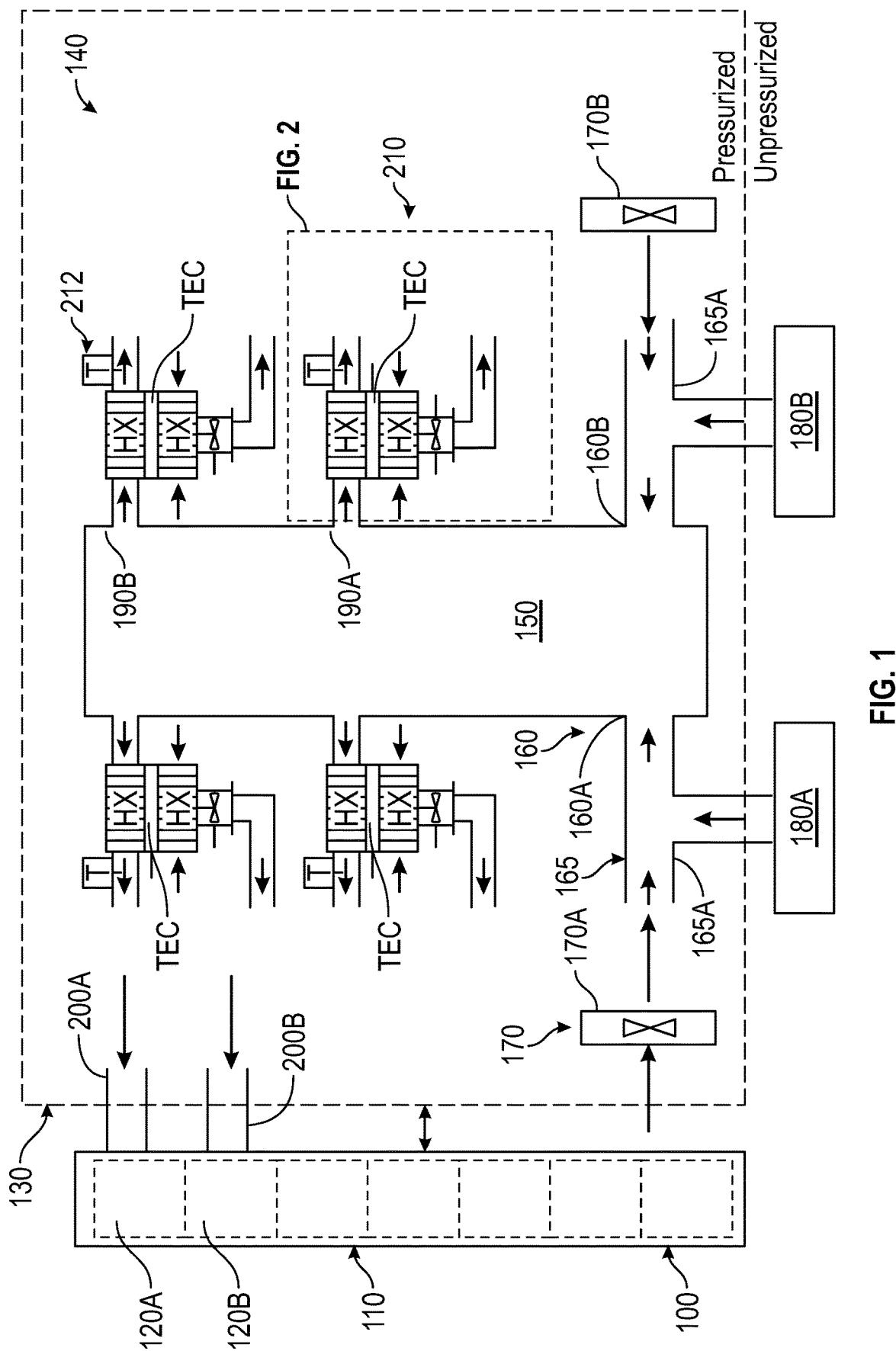
FIG. 1 shows an air distribution system of an aircraft.

Turning to FIG. 1, an aircraft 100 has a cabin 110 that is divided into different zones 120, e.g., first and second zones 120A, 120B. A bay 130 of the aircraft 100 has an ECS (or system) 140. The bay 130 is typically located below the cabin 110.

The system 140 includes a centralized mix manifold 150 that has at least one inlet 160 to receive cabin air from the cabin 110. As shown by way of example, the manifold includes first and second inlets 160A, 160B but these could be a single inlet. The at least one inlet 160 is fluidly coupled to at least one inlet duct 165. In the example shown in FIG. 1, in which the mix manifold 150 has first and second inlets 160A, 160B, first and second inlet ducts 165A, 165B are fluidly coupled to the first and second inlets 160A, 160B.

At least one recirculation fan 170 draws air from the cabin 110 to the mix manifold 150 via the at least one inlet duct 165. In the example shown in FIG. 1, in which the mix manifold 150 has first and second inlet ducts 165A, 165B, first and second recirculation fans 170A, 170B are provided which draw air from the cabin 110 into the inlets.

Cabin return air typically flows from vents located near the intersection of the fuselage and the cabin floor. The return flow moves into a cheek area of the cargo bay from which the recirculation fans 170A, 170B and thermoelectric coolers (TECs), discussed below, draw in the return flow. The cabin air is mixed with conditioned bleed air that is processed through first and second AC packs 180A, 180B. The ECS packs 180A, 180B are typically located in outside of the aircraft pressure vessel in an unpressurized bay. As shown in FIG. 1, the first and second AC packs 180A, 180B are fluidly coupled with the first and second inlet ducts 165A, 165B, between the first and second recirculation fans 170A, 170B and the mix manifold 150. The mix manifold 150 has outlets 190, e.g., first and second outlets 190A, 190B. The outlets 190 of the mix manifold 150 are fluidly coupled with the first and second zones 120A, 120B via zone ducts 200, e.g., first and second zone ducts 200A, 200B.

To accommodate different preferences in the zones 120A, 120B, air exiting the mix manifold 150 may need further conditioning by being heated or cooled by, e.g., 10 degrees Celsius, as a non-limiting example. According to the embodiments, to provide such further conditioning, trim modules, e.g., first and second trim modules 210, 212, are provided such that each of the zone ducts 200A, 200B is fluidly coupled to one of the trim modules 210, 212. Each of the trim modules 210, 212 may have a same configuration as each other so that further reference will be to the trim module 210.

Figure 2:
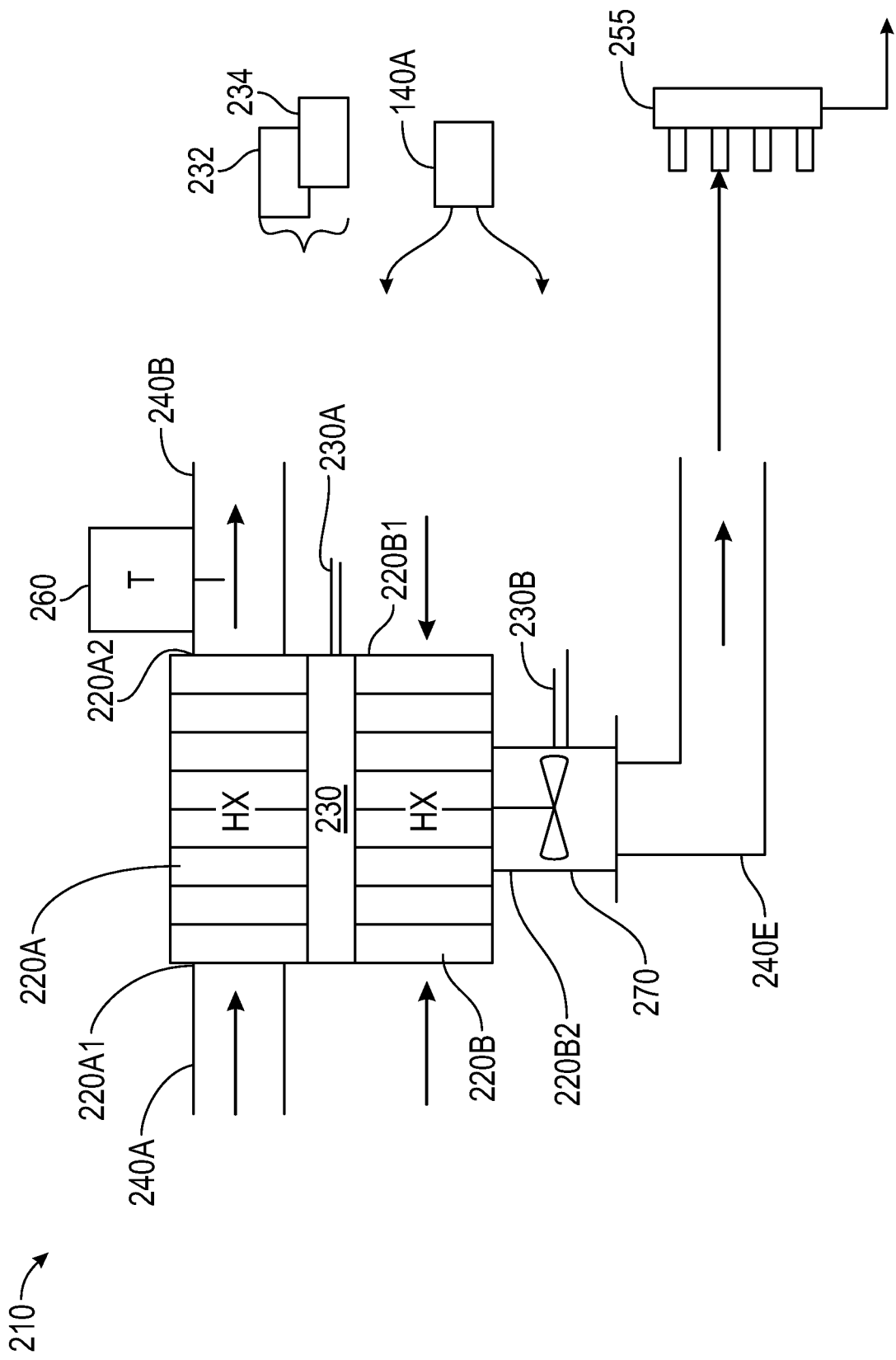
FIG. 2 shows details of a trim module of the system shown in FIG. 1.

Turning to FIG. 2, details of the trim module 210 are shown. The trim module 210 includes at least two heat exchangers 220, e.g., a first heat exchanger (a zone air heat exchanger) 220A and a second heat exchanger (a cabin return air heat exchanger) 220B. A thermoelectric cooler (TEC) module 230 is interposed and thermally coupled between the first and second heat exchangers 220A, 220B. The TEC modules can be Peltier devices that utilize the Peltier effect to create a heat flux at the junction of two different types of materials. A Peltier device (cooler, heater, or thermoelectric heat pump) is a solid-state active device which transfers heat from one side of the device to the other based on application of a voltage across the device. The direction of heat flow is based on the polarity of the voltage as will be understood by the skilled.

The TEC module 230 is operationally coupled to the system 140, e.g., via leads 230A that receive power (e.g., supply voltage) and control signals from a system control 140A. As can be appreciated, voltage magnitude and polarity to the TEC module 230 will control its direction and magnitude of heat transfer, e.g., from the first heat exchanger 220A to the second heat exchanger 220B and vice versa. The TEC module 230 may include a plurality of TECs, 232, 234 configured as a circuit 236. The plurality of TECs 232, 234 may be electrically coupled in series or parallel, thermally coupled in series or parallel, or for either coupling, as a combination of series and parallel, and may be organized as a stack, to achieve a desired thermal effect, improve fault tolerances and increase heat transfer capacity. To increase heat transfer via the TEC module 230, the heat exchangers 220A, 220B, may be manufactured from aluminum.

The trim module 210 may include various conduits 240. For example, a mix manifold conduit 240A is fluidly coupled between an inlet 220A1 of the first heat exchanger 220A and, e.g., the first outlet 190A (FIG. 1) of the mix manifold 150. A zone supply conduit 240B is fluidly coupled between an outlet 220A2 of the first heat exchanger 220A and, e.g., the first zone duct 200A (FIG. 1) that is fluidly coupled to the first zone 120A. The heat exchanger 220B is intended to draw cabin return air from the ambient environment surrounding the mix manifold 150 into an inlet 220B1 using the exhaust fan 270 (discussed below). An exhaust conduit 240E is fluidly coupled between an outlet 220B2 of the second heat exchanger 220B and a low-pressure TEC exhaust (overboard) manifold 255 (or exhaust manifold, for simplicity) of the system 140.

The trim module 210 may include a temperature sensor 260 located in the zone supply conduit 240B. An exhaust fan 270 may be fluidly coupled between the outlet 220B2 of the second heat exchanger 220B and the exhaust conduit 240E. The exhaust fan 270 may create negative pressure that draws air from bay 130 into the inlet 220B1 of the second heat exchanger 220B. This enables mixing of air from bay 130 and the cabin 110 within the second heat exchanger 220B when conditioning air from the mix manifold 150. The exhaust fan 270 is operationally coupled to the system 140, e.g., via leads 230B, to receive power (e.g., supply voltage) and control signals. As can be appreciated, the supply voltage and control signals to the exhaust fan 270 may differ from the supply voltage and control signals to the TEC module 230. That is, while the TEC module 230 may be controlled to alternatively direct heat transfer between the first and second heat exchangers 220A, 220B, the exhaust fan 270 is configured to exhaust waste air in one direction, i.e., away from the second heat exchanger 220B. The magnitude of the supply voltage to the exhaust fan 270 may be controlled to change the flow rate of air across the second heat exchanger 220B, depending on cooling or heating requirements. With the exhaust fan 270, waste air can be directed overboard from the exhaust manifold 255, or used for another purpose such as a driving a power turbine of an air cycle machine (ACM). Directing the exhaust air to the exhaust manifold 255 from the trim module 210 avoids adding unwanted heating and cooling of the aircraft cabin 130.

The TEC module 230 is configured to operate in a first mode or a second mode, depending on a temperature within the zone supply conduit 240B and a target temperature. In the first mode, the TEC module 230 is configured to transfer thermal energy from the first heat exchanger 220A to the second heat exchanger 220B. In the second mode, the TEC module 230 is configured to transfer thermal energy from the second heat exchanger 220B to the first heat exchanger 220A. Thus, during operation, a voltage magnitude and polarity to the TEC module 230 may be utilized to regulate the outlet temperatures of heat exchangers 220A, 220B to raise or lower the temperature of the mix manifold 150 by approximately 10 degrees Celsius, as indicated. That is, the trim module 210 provides for a heating and cooling capability of a zone 120 by varying the magnitude and polarity of voltage applied to the TEC module 230. When operating in either mode, as indicated above, the magnitude of the voltage to the exhaust fan 270 may be controlled to change the flow rate of air across the second heat exchanger 220B, depending on cooling or heating requirements.

With the above embodiments, a heating and cooling capability of the TEC module 230 enables optionally running the ECS 140 at a higher outlet temperature, which may translate into extra system capacity. Alternatively, a smaller ECS may be utilized. Locating the trim module 210 at the mix manifold 150 enables a low integration cost and weight for the trim module 210 because the system wiring and the exhaust manifold 255 are confined to the bay 130. As each trim module 210 is configured the same, there is a reduction in recurring manufacturing costs.

In addition to the above identified benefits, the configuration enables an elimination of, e.g., diverter valves, which enables the ability to provide steady exhaust flow for other uses. Conventional pneumatic zone trim valves, trim injectors, mufflers, ducting, couplings and its associated mounting hardware is also eliminated.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft, comprising:
    a mix manifold having an inlet and a plurality of outlets;
    a recirculation fan and an air conditioning pack fluidly coupled to the inlet;
    a plurality of trim modules located proximate the mix manifold and fluidly coupled to respective ones of the plurality of outlets of the mix manifold,
    each trim module of the plurality of trim modules comprising:
        a first heat exchanger having an inlet and an outlet;
        a second heat exchanger having an inlet and an outlet; and
        a thermoelectric cooler (TEC) module thermally coupled between the first and second heat exchangers;
        a mix manifold conduit fluidly coupled to the inlet of the first heat exchanger;
        a zone supply conduit fluidly coupled to the outlet of the first heat exchanger;
        an exhaust conduit fluidly coupled to the outlet of the second heat exchanger,
        wherein the TEC module is configured to operate in a first mode or a second mode, depending on a temperature within the zone supply conduit and a target temperature, and
        wherein:
            in the first mode, the TEC module is configured to transfer thermal energy from the first heat exchanger to the second heat exchanger; and
            in the second mode the TEC module is configured to transfer thermal energy from the second heat exchanger to the first heat exchanger,
        a temperature sensor in the zone supply conduit, at the outlet of the first heat exchanger, wherein the TEC module is configured to operate in the first mode or the second mode depending on the temperature sensed by the temperature sensor and the target temperature,
        an exhaust fan fluidly coupled to the outlet of the second heat exchanger and the exhaust conduit to draw air from an ambient environment around the mix manifold into the inlet of the second heat exchanger,
    wherein the plurality of outlets of the mix manifold are fluidly coupled to the mix manifold conduit of respective ones of the plurality of trim modules;
    an exhaust manifold fluidly coupled to the exhaust conduit of the second heat exchanger of each of the plurality of trim modules.

2. The system of claim 1, wherein:
    the TEC module includes a plurality of thermoelectric coolers configured as a circuit.

3. An aircraft comprising:
    a cabin including a zone, the zone including a zone duct;
    a bay under the cabin; and
    the system of claim 1 disposed in the bay, wherein the zone supply conduit of the first heat exchanger is fluidly coupled to the zone duct of the zone.

4. The aircraft of claim 3, wherein:
    the TEC module includes a plurality of thermoelectric coolers configured as a circuit.

5. The aircraft of claim 4, wherein:
    the plurality of thermoelectric coolers are electrically coupled in series or parallel.

* * * * *